United States Patent [19]

Heinrich

[11] Patent Number: 5,435,143
[45] Date of Patent: Jul. 25, 1995

[54] MACHINE AND METHOD FOR MAKING HARDENED CONFECTIONS HAVING COMPLEMENTARY PARTS JOINED IN A UNIT

[75] Inventor: David B. Heinrich, Columbus, Ohio

[73] Assignee: Nestec, Ltd., Vevey, Switzerland

[21] Appl. No.: 206,388

[22] Filed: Mar. 4, 1994

[51] Int. Cl.⁶ ............................................. A23G 9/26
[52] U.S. Cl. .................................... 62/75; 62/345;
425/261; 426/101; 426/134; 426/249; 426/515;
426/524
[58] Field of Search ................. 62/345, 75; 425/126.2,
425/134, 259, 261; 426/100, 101, 134, 249, 515,
524

[56] References Cited

U.S. PATENT DOCUMENTS

| | | | |
|---|---|---|---|
| 4,546,615 | 10/1985 | Gram | 62/345 X |
| 4,611,468 | 9/1986 | Degn | 62/345 X |
| 4,986,080 | 1/1991 | Grigoli et al. | 62/345 X |
| 5,343,710 | 9/1994 | Cathenaut et al. | 62/345 X |
| 5,359,858 | 11/1994 | Miller et al. | 62/345 X |

OTHER PUBLICATIONS

Gram, product brochure, ". . . Leading the world in refrigeration", 93 08 6.000 GB.
Gram, product brochure, Ice Cream, Automatic Rotary Novelty Freezers, RIA. 7.46.60 2000 GB 11.89.
Alfa-Laval/Hoyer, product brochure, Ice Cream Equipment, No. SY 80040 E, Reg. OGA1 91.05 5.000.

Primary Examiner—William E. Tapolcai
Attorney, Agent, or Firm—Porter, Wright, Morris & Arthur

[57] ABSTRACT

A rotary machine and method for making unit confections of complementary parts which consist of different recipes, flavors, colors, textures and/or mix inclusions having concentric groups of complementary molds essentially radially aligned in or on annular sections of a rotating table, in which a group of first molds in a first annular section produces physical shapes which fit within and complementarily join all or part of the physical shapes produced in a group of second molds in a second annular section that is concentric with the first annular section.

27 Claims, 2 Drawing Sheets

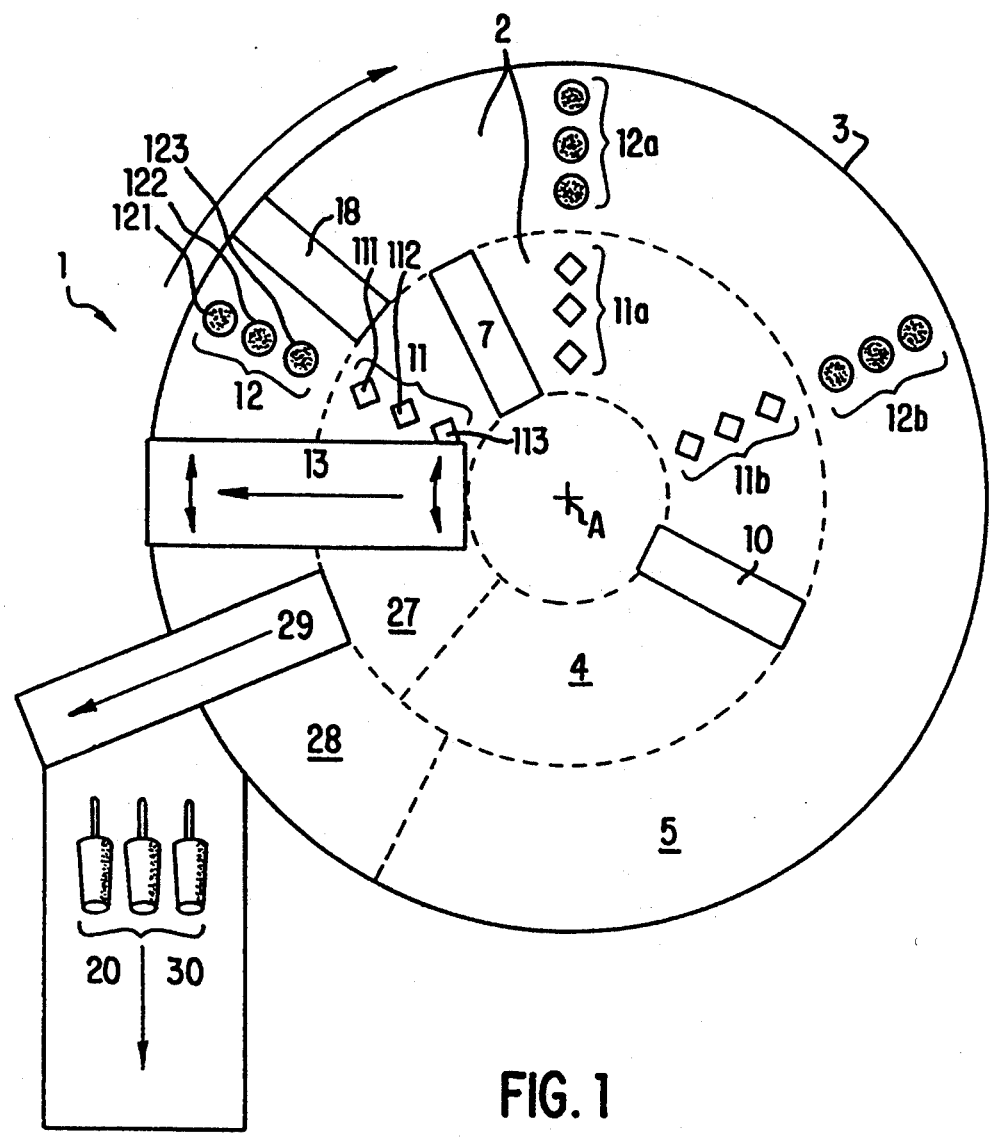
FIG. 1
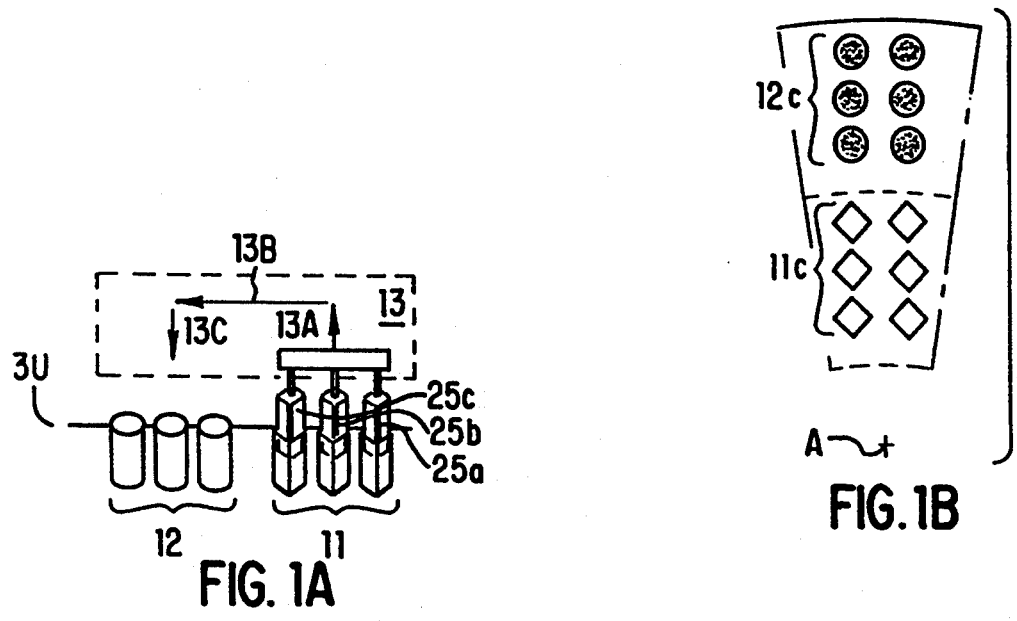
FIG. 1A
FIG. 1B

MACHINE AND METHOD FOR MAKING HARDENED CONFECTIONS HAVING COMPLEMENTARY PARTS JOINED IN A UNIT

FIELD OF THE INVENTION

This invention relates to a machine and method for making hardened confections of physically joined complementary parts which consist of different recipes, flavors, colors, textures and/or mix inclusions. The parts have complementary shapes which are joined in a resulting confection unit. The confection units are frozen or hardened confections or ices which may be flavored ice, ice cream, frozen yogurt, sherbert, sorbet and the like, known in the industry generically as "frozen confections," "hardened confections" or "ices."

More particularly, the invention includes a rotary machine having concentric groups of complementary molds. A group of first molds produces first physical shapes which complementarily join with all or part of second physical shapes produced in a group of second molds into which the molded first physical shapes are introduced. The resulting confections can each have two or more complementary constituents that may be further differentiated by recipe, flavor, color, texture and/or mix inclusions. The complementary constituents may be visually as well as gustatorily distinct in the confection unit.

BACKGROUND OF THE INVENTION

Chain-conveyor parallel row machines having parallel rows of molds and rotary table machines having concentric groups of molds for making ice confections are known in the art. A chain-conveyor parallel row machine has molds arranged in parallel rows which are caused to linearly advance through a freezing tank by means of a conveying chain. An example of such a machine is shown in U.S. Pat. No. 4,759,197. A rotary table molding machine having concentric groups of molds for making ice confections uses concentric groups of molds in annular sections which are caused to rotatably advance through a freezing tank by means of a circular mold table.

These known types of machines permit certain types of diversified products to be obtained during a work cycle. Multiple-flavored ice confections can be produced as layers of different flavored ices which are obtained by filling molds in successive steps with different products, as the molds advance in a production cycle. Such machines are also capable of producing "shell and core" confections in which the "core" is removed by suction before it solidifies but after the "shell" solidifies. Another product is then introduced into the resulting space within the shell.

U.S. Pat. No. 4,986,080 ("the '080 patent") discloses a chain-conveyor parallel row machine having parallel rows of molds and a method of producing double-flavor ices. The '080 patent is a particular adaptation of the machine disclosed in U.S. Pat. No. 4,759,197. The '080 patent discloses a machine in which parallel rows of molds are intermittently advanced through a freezing section by means of a conveying chain. The parallel rows of molds differ in shape, one row to the next, such that the cross-sections of molds of some rows are stated to be "inscribable" into the cross-sections of molds in other rows. The '080 patent includes metering-filling units, a stick-inserting unit and withdrawing devices such as are known in the art.

In general, chain-conveyor parallel row machines have certain operational disadvantages. These include: inefficient mold utilization, resulting from fewer than 50% of all molds being in use at any time; inefficient floor plan utilization, resulting from the complete machine having a significant length; poor repeatability of mold positioning, resulting from variations in conveyor chain pitch dimensions due to wear; and incomplete sealing of the mold area from the freezing area, resulting from jointed, articulated construction inherent in a chain conveyor.

Rotary machines resolve several of these difficulties. Molds are located in a circular unitized mold table that effectively seals the product from the mold chilling brine, which is a hygienic advantage. The chain-conveyor parallel row machines carry molds in a jointed, articulating conveyor that is difficult to seal in order to avoid product contamination by the mold chilling brine. Also, unlike the rotary table machine, the chain-conveyor parallel row machine requires that molds be returned to the "start" position by passing molds upside down under the machine typically through an energy and water consuming washing system. The manner of returning molds to the start position results in a mold utilization factor of less than 50% whereas a mold utilization factor for rotary table machines can be higher than 75%. Mold utilization factor is important because molds are expensive.

SUMMARY OF THE INVENTION

A machine and method is provided for making unitized confections of complementary parts in an efficient manner that overcomes problems of the chain-conveyor parallel row machines and achieves the advantages incident to rotary design. In particular, the invention uses at least two groups of complementary molds arranged concentrically on a rotating table. The first concentric mold group produces physical shapes which complementarily join with all or part of the shapes produced in the second concentric mold group. The shapes produced by the first mold group are introduced into the molds of the second group and a unitized confection of two parts results. The first and second mold groups are aligned essentially radially with respect to the rotating table. This confection may consist of complementary parts of different recipes, flavors, colors, textures and/or mix inclusions; and the complementary parts may be visually and/or gustatorily distinct in the confection unit.

This invention includes at least one solidifying (i.e., hardening or freezing) section through which each of the concentric groups of complementary molds are advanced by rotation. The molds may be advanced in a unitized table configuration by a drive mechanism for rotatably advancing the concentric groups of molds about an axis. The molds of the respective groups determine the complementary shapes that form the finished confection unit. A first filling unit is provided to introduce a first product into the first molds. Sticks are inserted into the product in the first molds. After the product in the first molds solidifies, a withdrawing and transfer mechanism withdraws the solidified product from the first molds and transfers the molded product essentially radially to the second molds. The molded product from the first molds is sized such that it fits within the second molds.

A second filling unit is provided to introduce a second product differing from the first product into spaces existing between the inner wall of the second molds and the surface of the molded product from the first molds contained therein. This second product then solidifies as the second molds are advanced by rotation through the solidifying section. A withdrawing unit then withdraws the resulting solidified two-product confection units from the second molds, and the confection is transferred for further processing, such as coating if desired, and wrapping and packaging.

In the method of the invention, a first group of molds is provided within a first annular section of a unitized table. A second group of molds, complementary in shape with the first group of molds, receives therein the molded product from the first molds. The second group of molds are within a second annular section of the rotating table. The concentric groups of complementary molds are advanced by rotation through a solidifying section. The group of first molds is filled with a first product; sticks are inserted into the filled first molds. When solid, the solidified molded products, with the stick inserted, are withdrawn from the first molds and laterally, or radially, transferred from the first molds into the second molds where spaces existing between the inner wall of the second molds and the outer surface of the first molded products are filled with a second given product. When solidified, the resulting confection units are withdrawn from the second molds.

The invention may also include a unitized table to rotatably advance the concentric groups of complementary molds in the course of a production cycle. The first and second filling units which introduce product into the molds may also fill the respective molds with a quantity of respective products during a predetermined period of time (a "time fill"), according to a predetermined volumetric measure (a "volumetric fill") or by a predetermined weight measure (a "weight fill"). The complementary parts of the resulting confections may consist of different recipes, flavors, colors, textures and/or mix inclusions.

The resulting product is a confection unit of distinct complementary parts consisting of multiple recipes, flavors, colors, textures and/or mix inclusions, wherein separate physical shapes complementarily join with all or part of other physical shapes.

BRIEF DESCRIPTION OF THE DRAWINGS

FIG. 1 shows a plan view of the machine for making confection units of complementary parts in accordance with the present invention.

FIG. 1A is a figurative representation showing the withdrawal of molded product from the first molds and its transfer into the second molds in an essentially radial transfer across the annular sections of the rotating table by a withdrawing and transfer mechanism.

FIG. 1B shows a section of an alternate table configuration having multiple sets of mold groups in the annular sections of the rotating table.

DESCRIPTION OF THE PREFERRED EMBODIMENT

Figure 1C:
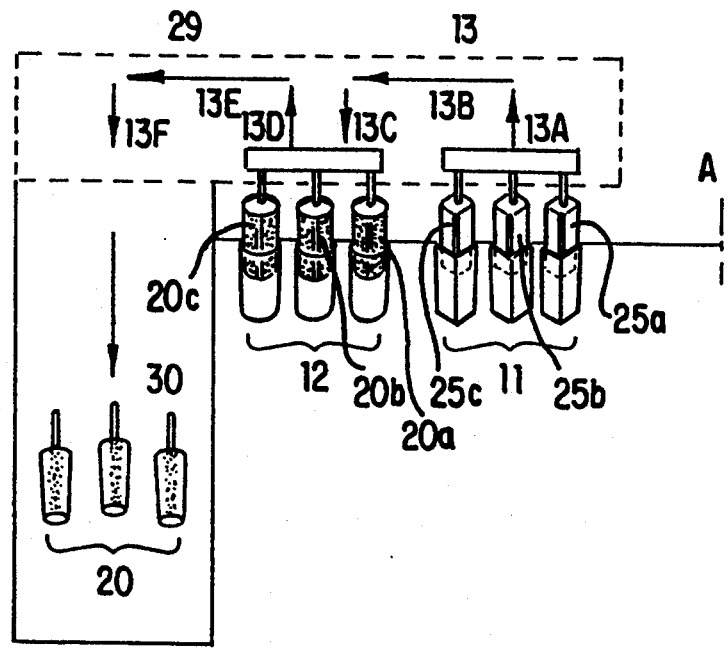
FIG. 1C illustrates the action of a single unit withdrawal and transfer mechanism transferring intermediate product to the second molds and transferring finished molded products to a chute or conveyor.

Referring now to the drawings, FIG. 1 illustrates an embodiment of the machine 1 of the present invention for making confection units of complementary parts. FIGS. 2 and 2A show the unit confection 20 produced by the invention having an inner core 21 formed by a single mold in a first group of molds in the machine 1 and a complementary second shape 22 formed by a single mold in a second group of molds in the machine 1. A stick inserted into the confection unit is shown as 23. The stick 23 may be flat, round, or other functional or decorative shape and is formed from wood, polymer, paper or other material as is known in the art. FIG. 2B shows an example 25 of the intermediate product, or inner core, 21 with a stick 23 after the product has been removed from a single mold in a first group of molds.

In FIG. 1, the machine 1 is a rotary machine that comprises a solidifying section 2 through which, as located on or in rotating table 3, concentric groups 11 and 12, 11a and 12a, 11b and 12b, etc., of complementary molds are rotatably advanced in an essentially circular path. The table is preferably planar and horizontally oriented. The individual molds in the groups 11 and 12 are respectively indicated as 111, 112 and 113 and 121, 122 and 123. The individual molds in both groups of molds are preferably tapered so as to facilitate withdrawal of molded product therefrom. The mold groups are in annular sections 4 and 5 of the rotating table and may be aligned radially and may comprise a group of molds in a single line as shown in FIG. 1A at 11 and 12 or in adjacent groupings as shown in FIG. 1B. In FIG. 1B, six molds in each mold group are respectively shown at 11c and 12c in respective annular sections of the table. The solidifying section 2 may be a brine bath, spray system or other mechanism that provides a solidifying or freezing environment, sufficient to harden a confection, such as is known in the art.

The molds in the first group 11 differ from the molds in the second group 12 such that a solidified molded product from the individual molds in the first mold group 11 will fit within the individual molds in the second mold group 12. Groups of molds comparable to groups 11 and 12 may be located on or in the table 3 respectively in the inner section 4 and outer section 5 of the rotating table 3 such as shown as 11a and 12a, 11b and 12b, etc. Also, more than two different groups of radially arranged, concentric, complementary molds may be used to make confections with more than two different recipes, flavors, colors, textures and/or mix inclusions.

With reference to FIG. 1, the machine 1 includes a rotating table 3 having disposed thereon groups of two different types of molds 11 and 12, which respectively produce intermediate product (25 in FIG. 2B) and finished product (20 in FIG. 2). Point A is the axis of rotation of the horizontal rotating table 3. Each of the groups of molds 11 and 12 are disposed with respect to respective filling units 7 and 18 and, after the molds are filled with product, the filled molds pass through a solidifying section 2. During this passage, the product in the molds hardens. Intermediate in the rotational cycle for the groups of molds 11 is a stick inserter 10. The groups of molds 11 and 12 complete a rotational cycle after passing through respective warming sections 27 and 28 which "loosen" solidified product from the molds so it can be removed.

In a preferred embodiment, the concentric groups of molds are disposed on a circular, flat, horizontal rotating table. A first filling unit 7, for filling the first molds, is operationally disposed at or proximate to a beginning position of a one rotation cycle for the first molds. The first filling unit 7 introduces a liquid product into the first molds when the first molds are positioned under the first filling unit 7. Arctuately disposed with regard to the first filling unit 7, there is a stick-inserting unit 10 designed to insert sticks 23 into the product in the first molds when the product starts to solidify during the rotational cycle.

The product in the first molds is solidified by the time the molds reach the withdrawing and transfer mechanism 13, which is located before the end of the rotational cycle of the first molds and at approximately the beginning of the rotational cycle of the second molds. At this point both the filled group of first molds and the corresponding group of empty second molds are positioned, essentially radially aligned with respect to the axis of the table, at the withdrawing and transfer mechanism 13 at the same time. The location of the withdrawing and transfer mechanism 13 corresponds to the beginning of the one rotation cycle for the second molds.

At the withdrawing and transfer mechanism 13, as illustrated in FIG. 1A, the solidified products 25a, 25b and 25c in the first molds 11, as a group, are loosened from the molds after passing through the warming section. The product is removed from the first molds 11 and transferred into the second molds 12 which are sized such as to receive therein the frozen product 25 of the first molds. To facilitate withdrawal of the frozen product 25 from the first molds, the outer surfaces of the first molds are subjected to "warming" in a manner known in the art, for example, by the aid of brine, air or other fluid at a given temperature introduced from below the molds. A warming brine spray section, through which the first molds are advanced, is positioned in FIG. 1 at 27.

In FIG. 1A, the transfer of first molded product 25a, 25b and 25c, as a group, from first mold group 11 to second mold group 12 is effected by grasping the inserted sticks 23 and withdrawing the product 25 up and out of the first molds 11, then shifting the product radially across the upper table surface 3U to position 25a, 25b and 25c over second mold group 12. The product 25 is then lowered, dropped or inserted into the molds 12, essentially following the arrowed sequence up, across and down, as shown by 13A, 13B, and 13C. The mechanism is then recycled for the next mold group 11a, etc.

If the withdrawal and transfer occurs when rotational movement of the table is stopped, the transfer is in a straight axial movement. If, however, the transfer occurs as the table rotates, the movement by the transfer mechanism is coordinated with the table rotation such that the transfer operation is conducted according to a reciprocating time and positional sequence in correspondence with the table rotation and angular mold separation.

The withdrawal of the molded products from the first group of first molds and the transfer of the molded products into the first group of second molds occurs while the other groups of complementary first and second molds contain product therein. The transfer of the molded products from the first molds to the corresponding second complementary molds is an essentially radial transfer in the rotary machine.

The molded products from the first molds are sized to fit within the second molds and may or may not contact the inner walls of the second molds. Product from the first molds may also have shapes with cross-sections that do not contact the inner side wall of the second molds except at the bottom. In this situation, mechanical supports may be provided by which the molded products from the first molds are held upright in the second molds. This allows the molded product to stand upright in the second molds when a second liquid product from the second filling unit is introduced in the space existing between the inner wall of the second molds and the molded product from the first molds.

After the products from the first molds are withdrawn from the first molds and transferred into the second molds by mechanism 13, the second molds, with the product from the first molds therein, continue to advance through the solidifying or freezing section 2 to a second filling unit 18. When the second molds are positioned beneath the second filling unit 18, the second filling unit 18 introduces a second product into the second molds to fill the spaces existing between the inner wall of the second molds and the molded product transferred from the first molds into the second molds. The second filling unit 18 fills the second molds with a quantity of the second product according to a predetermined time fill, volumetric fill or weight fill. The second product is of a different recipe, flavor, color, texture and/or mix than is introduced by the first filling unit 7.

After the second molds are filled by the second filling unit 18, the filled molds are rotatably advanced through the solidifying section 2 to solidify the introduced second liquid product. To facilitate withdrawal of the resulting solidified multi-part confections from the second molds, the second molds are "warmed" in a manner as noted above, for example, by the aid of a spray or bath of brine or other fluid directed from below the molds in the warming section 28 through which the second molds are advanced. Then a second withdrawing unit 29 withdraws the confections from the second molds. Withdrawing and transfer mechanism 29 essentially corresponds in structure and operation to either intermittent or continuous operation of unit 13 as described above.

Figure 2:
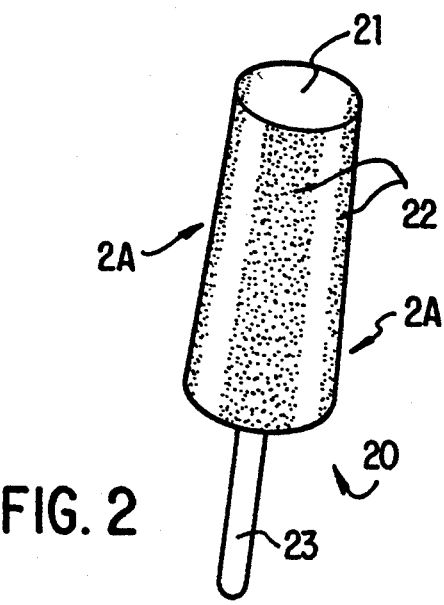
FIG. 2 shows an example of a confection unit produced by the method and machine herein.
Figure 2B:
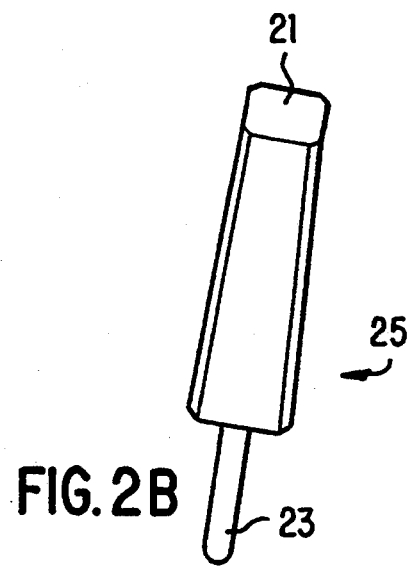
FIG. 2B shows an example of the solidified intermediate product from the first molds produced by the method and machine herein.
Figure 2A:
FIG. 2A is a cross-sectional view of the confection unit taken along line 2A—2A of FIG. 2 showing the shapes of the different parts.

Mechanism 29 may be combined with unit 13, whereby finished confection units 20a, 20b and 20c are withdrawn from molds 12 and deposited on a chute or conveyor 30 in an up, across and down movement as shown by 13D, 13E and 13F in FIG. 1C essentially simultaneously as the intermediate products 25a, 25b and 25c are shifted from mold group 11 to mold group 12 in arrowed sequence 13A, 13B and 13C in FIG. 1C.

The confections 20 are transported to a conventional wrapping and packaging station in a manner known in the art, such as with a chute or conveyor 30.

After the product is removed from the first molds, the first molds do not remain empty until the corresponding confection of complementary parts is withdrawn from the second molds at the end of another rotational cycle. Instead, the first molds are promptly refilled by the first filling unit 7 and the process continues as stated above for the first molds while the second molds with first molded product therein are being filled, solidified and removed during the rotational cycle. Thus the concentric groups of molds in the inner and outer sections of the rotary machine are used at a high efficiency throughout the rotational cycle. This is an improvement in efficiency over chain-conveyor parallel row machines in which more than one half of the molds remain empty during a product forming cycle. As a consequence, the rotary machine requires fewer molds to process the same capacity of ice confections than chain-conveyor parallel row machines. In addition, the rotary machine continuously performs in a cyclical rotational cycle of the unitized circular table. Time, temperature and specific rotational cycles are determined by the hardening and/or freezing characteristics of the product introduced into the molds and can be determined by those familiar with recipe requirements.

The resulting products from the machine 1 and method as described above and shown in FIG. 2 and 2A are confections of complementary parts, wherein the complementary parts consist of visually or gustatorily distinct shapes, recipes, flavors, colors, textures and/or mix inclusions. Many different variations of arbitrary shape configurations are obtainable, some of which are shown in the aforementioned '080 patent. By varying the shapes of the first and second molds, and as long as the molded product from the first molds fits within the cross-section of the corresponding second molds, many variously shaped confections of complementary parts can be formed. The confections may also be coated with chocolate and/or other coatings, by spraying or dipping the units into a final bath of a given product, as is known in the art.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A machine for making hardened confections of complementary parts, comprising:
   at least two concentric groups of complementary molds, said groups including a group of first molds for producing a solidified physical shape which fits within the molds in a group of second molds;
   at least one solidifying section through which said concentric groups of first and second molds are each advanced by rotation;
   a first filling unit for introducing a first product into said first molds;
   a stick inserter for inserting a stick into the product molded in the first molds;
   a first withdrawing and transfer mechanism for withdrawing solidified product from said first molds and for transferring said withdrawn product, essentially radially with respect to said concentric groups, into said second molds;
   a second filling unit for introducing a second product into said second molds to fill the spaces in the second molds not occupied by the first molded products contained therein;
   a second withdrawing and transfer mechanism for withdrawing the confections from said second molds after the second product solidifies; and
   a drive mechanism for rotatably advancing the concentric groups of molds in a path about an axis.

2. The machine of claim 1 further comprising a unitized planar table that is horizontally disposed for rotatably advancing said concentric groups of molds about a central axis.

3. The machine of claim 1 wherein said first filling unit is operationally disposed at or proximate to a beginning position of a one rotation cycle.

4. The machine of claim 1 wherein said first filling unit fills said first molds with a quantity of the first product according to one of a predetermined period of time, a predetermined volumetric measure and a predetermined weight measure.

5. The machine of claim 1 wherein said second filling unit fills said second molds with a quantity of the second product according to one of a predetermined period of time, a predetermined volumetric measure and a predetermined weight measure.

6. The machine of claim 1 wherein said stick-inserting unit is located above the advancement path of said first molds and is positioned with respect to the rotation path of the molds such that sticks are introduced therein before the first product solidifies.

7. The machine of claim 1, wherein said first withdrawing and transfer mechanism is located before the end of the rotation path of said first molds and at approximately the beginning of the rotation path of said second molds.

8. The machine of claim 1 in which said first withdrawing and transfer mechanism includes means for grasping the sticks inserted into the product in the first molds, lifting the product from the first molds, essentially radially conveying the product to a location above the second molds and depositing the product therein.

9. The machine of claim 1 wherein said second withdrawing and transfer mechanism is located before the end of the rotation path of said second molds.

10. The machine of claim 1 in which before the molded products withdrawn from said first molds are transferred into said second molds, said molded products are caused to move concentrically in an advancing motion with respect to rotational movement of the molds.

11. The machine of claim 1 in which before the molded products withdrawn from said first molds are transferred into said second molds, said molded products are caused to move concentrically in a retarding motion with respect to rotational movement of the molds.

12. The machine of claim 1 wherein said first withdrawing and transfer mechanism and the second withdrawing and transfer mechanism comprise a single integrated unit.

13. The machine of claim 12 wherein the withdrawal and transfer of products by said first and second withdrawing and transfer mechanisms occur essentially simultaneously.

14. The machine of claim 1 in which said second filling unit introduces a product having a recipe differing from the recipe of the first product introduced by the first filling unit.

15. The machine of claim 14 in which said second filling unit introduces a product having a recipe differing in one or more than one of flavor, color, texture and mix inclusions from the recipe of the first product.

16. The machine of claim 1 further including a warming section located proximate to the end of the rotation path of said first molds and before said withdrawing and transfer mechanism.

17. The machine of claim 1, further including a warming section located proximate to the end of the rotation path of said second molds and before the withdrawing unit, said warming section facilitating the withdrawal of solidified confections from said second molds.

18. The machine of claim 16, wherein said warming section comprises one of a fluid bath and a fluid spray.

19. The machine of claim 17, wherein said warming section comprises one of a fluid bath and a fluid spray.

20. A machine for making hardened confections of complementary parts, comprising:
at least two concentric groups of complementary molds, said groups including a group of first molds for producing a physical shape which complementarily joins with all or part of the physical shape produced by molds in a group of second molds within which the shapes produced by the first molds fit;
a substantially circular and flat unitized table that is horizontally disposed and operatively connected to a drive mechanism for rotatably advancing said concentric groups of molds about a central axis;
a drive mechanism for rotating the unitized table;
at least one solidifying section through which said concentric groups of first and second molds are each advanced by rotation;
a first filling unit for introducing a first product into said first molds, said first filling unit being operationally disposed at or proximate to a position defining a beginning of one rotation cycle;
a stick-inserting unit located above the advancement path of said first molds and positioned with respect to the rotational path of said first molds such that sticks are introduced therein during the hardening of the first product;
a withdrawing and transfer mechanism for withdrawing solidified product from said first molds and for transferring said withdrawn molded product into said second molds;
a second filling unit for introducing a second product differing from the first product into the second molds to fill the space therein not occupied by the first molded product contained therein; and
a withdrawing unit for withdrawing product from said second molds after the second product solidifies.

21. A method of making hardened confections of complementary parts, comprising the steps of:
providing a first group of molds within a first annular section of a unitized table;
providing a second group of molds complementary in shape with the first molds, within which product molded in the first group of molds fits, within a second annular section of a unitized table;
causing said first and second groups of molds to each advance by rotation through an environment in which product introduced into the molds is solidified;
filling molds of the first group with a first product;
withdrawing solidified product from said first molds and transferring said product into said second molds;
filling the second molds with a second product to fill the volume of the second mold that is not occupied by the transferred solidified product from the first mold; and
withdrawing the molded products from said second molds when the second product is solidified.

22. The method of claim 21 wherein the advance by rotation of the concentric groups of molds is continuous.

23. The method of claim 21 wherein the advance by rotation of the concentric groups of molds is intermittent.

24. The method of claim 21 further comprising the step of filling said first molds with a quantity of the first product with respect to at least one of a predetermined period of time, a predetermined volumetric measure, and a predetermined weight measure.

25. The method of claim 21 further including the step of inserting a stick into the product in the first molds.

26. The method of claim 21 further including the step of warming the molds before the solidified product therein is withdrawn.

27. A rotary machine for making unit confections of complementary parts which consist of different recipes, flavors, colors, textures and/or mix inclusions comprising concentric groups of complementary molds essentially radially aligned in or on annular sections of a rotating table, in which a group of first molds in a first annular section produces physical shapes which fit within and complementarily join all or part of the physical shapes produced in a group of second molds in a second annular section that is concentric with the first annular section.

* * * * *